United States Patent
Hirschberg

(10) Patent No.: US 10,501,211 B1
(45) Date of Patent: Dec. 10, 2019

(54) PRE AND POST ORBIT MANEUVER PULSES TO REDUCE FLEXURAL OSCILLATIONS

(71) Applicant: Space Systems/Loral, LLC, Palo Alto, CA (US)

(72) Inventor: Philip Conway Hirschberg, Fremont, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 1294 days.

(21) Appl. No.: 14/972,736

(22) Filed: Dec. 17, 2015

(51) Int. Cl.
*B64G 1/26* (2006.01)
*B64G 1/38* (2006.01)
*B64G 1/24* (2006.01)

(52) U.S. Cl.
CPC .................. *B64G 1/38* (2013.01); *B64G 1/24* (2013.01)

(58) Field of Classification Search
None
See application file for complete search history.

(56) References Cited

U.S. PATENT DOCUMENTS

| 3,977,633 | A | | 8/1976 | Keigler et al. | |
|---|---|---|---|---|---|
| 4,386,750 | A | | 6/1983 | Hoffman | |
| 4,916,635 | A | | 4/1990 | Singer et al. | |
| 5,222,023 | A | * | 6/1993 | Liu | B64G 1/26 244/170 |
| 5,610,848 | A | * | 3/1997 | Fowell | B64G 1/24 708/300 |
| 5,638,267 | A | | 6/1997 | Singhose | |
| 5,957,411 | A | * | 9/1999 | Liu | B64G 1/26 244/164 |
| 6,311,929 | B1 | | 11/2001 | Kazimi | |
| 6,505,085 | B1 | * | 1/2003 | Tuttle | B25J 9/1605 700/28 |
| 7,281,367 | B2 | | 10/2007 | Rohrbaugh et al. | |

FOREIGN PATENT DOCUMENTS

DE 10 2005 055 920 A1 5/2007

OTHER PUBLICATIONS

Boesiger, E., 35th Aerospace Mechanisms Symposium, NASA/CP-2001-209626, May 9-11, 2001, 28 pages.
Deng et al., "Dual-Satellite Formation Flying Demonstration in Near Circle Orbit," Microsat Research Center, Zhejiang University, P.R. China, Supported by "the Fundamental Research Funds for the Central Universities," 15 pages.
Singh et al., "Tutorial on Input Shaping/Time Delay Control of Maneuvering Flexible Structures," Optimal Reference Shaping for Dynamical Systems, Theory and Applications, CRC Press, A Chapman & Hall Book, 16 pages.

* cited by examiner

*Primary Examiner* — Richard G Davis
(74) *Attorney, Agent, or Firm* — Weaver Austin Villeneuve & Sampson LLP

(57) ABSTRACT

Techniques for performing an orbital maneuver on a spacecraft by firing a thruster include executing a first double pulse, double coast firing (DPDC) sequence with the thruster prior to the orbital maneuver, firing the thruster for a duration of the orbital maneuver, and executing a second DPDC firing sequence with the thruster subsequent to the orbital maneuver.

20 Claims, 12 Drawing Sheets

Detail F

Detail G

PRE AND POST ORBIT MANEUVER PULSES TO REDUCE FLEXURAL OSCILLATIONS

TECHNICAL FIELD

This invention relates generally to a spacecraft orbital maneuver strategy and, in particular, to techniques for reducing flexural oscillations of a spacecraft appendage resulting from a spacecraft orbital maneuver.

BACKGROUND

The assignee of the present invention designs and manufactures spacecraft for operation in, for example, geosynchronous and low earth orbits. In an on-orbit configuration, such spacecraft may have one or more deployed appendages, such as solar arrays or payload components. Such an appendage may be attached to a main body of the spacecraft by way of a mechanical coupling. In view of a requirement to minimize hardware mass, a highly rigid mechanical coupling may be impractical. As a result, dynamic response (cyclic relative motion between the appendage and the main body) of the deployed system that may result from disturbances such as a thruster firing must be anticipated. It is desirable to limit the amplitude of the dynamic response, without increasing hardware mass.

One technique to reduce dynamic response to the deployed system resulting from a thruster firing for an orbit maneuver is disclosed in "Flycast Maneuver for Shuttle Radar Topography Mission", Thomas A. Trautt, published in $35^{th}$ Aerospace mechanism symposium, 2001, pg. 95-107 (hereinafter, "Trautt"). Trautt discloses pulsing a thruster prior to and after an orbit maneuver according to a sequence illustrated in FIG. 1. The thruster pulse duration is set at T/6, where T is the calculated natural period of a system that includes a deployed boom. Following the pulse, and prior to the orbit maneuver, a first coast interval, also having a duration of T/6 is executed, a coast interval being a period of time in which the thruster is not fired. At the end of the orbit maneuver a second coast interval of duration of T/6 is executed, followed by a second thruster pulse also having a duration of T/6. Trautt refers to the above described sequence, which will be referred to herein as a "single pulsed single coast", or "SPSC" sequence, as a "Flycast Maneuver".

Where the period T is accurately calculable, the techniques disclosed in Trautt are effective to reduce the maximum deflection, and substantially eliminate oscillation of the appendage, as may be observed in FIG. 2. Detail A of FIG. 2 illustrates the analytically determined appendage deflection 'q' versus time during and after an orbit maneuver in the absence of the SPSC sequence. In the illustrated example, an average deflection amplitude of $q_{SS}$ occurs during the orbit maneuver and an average deflection amplitude of 2 $q_{SS}$ occurs subsequent to the orbit maneuver. Detail B illustrates the analytically determined appendage deflection 'q' versus time for an orbit maneuver accompanied by a pre-and post-maneuver SPSC sequence is executed, assuming perfect knowledge of T. With the assumption that T is perfectly calculable, the SPSC sequence is seen to be effective to reduce the maximum deflection by about 50% and to substantially eliminate post-maneuver oscillations.

In many actual space systems, however, there is significant unavoidable uncertainty in the value of T. For example, referring now to Detail C of FIG. 2, where an actual value of T is 20% different than calculated, a substantially higher amount of deflection and continued post-maneuver oscillation of the appendage can result.

As a result, an improved pre-and post-maneuver thruster firing strategy is desirable.

SUMMARY

The present inventor has appreciated that a double pulse double coast (DPDC) sequence performed pre-and post-maneuver can achieve all the nominal benefits of the SPSC technique while providing substantially reduced oscillation magnitude, taking into account uncertainties in the calculation of system natural frequency and corresponding period of oscillation.

According to some implementations, a method for performing an orbital maneuver on a spacecraft by firing a thruster includes executing a first double pulse, double coast firing (DPDC) sequence with the thruster prior to the orbital maneuver, firing the thruster for a duration of the orbital maneuver, and executing a second DPDC firing sequence with the thruster subsequent to the orbital maneuver.

In some examples, the first DPDC firing sequence may include a first pulse firing having a first duration $T_{a1}$, followed by a first coast interval having a second duration $T_{b1}$, followed by a second pulse firing for the second duration $T_{b1}$, followed by a second coast interval for the first duration $T_{a1}$. The second DPDC firing sequence may include a third coast interval for a third duration $T_{a2}$, followed by a third pulse firing for a fourth duration $T_{b2}$, followed by a fourth coast interval for the fourth duration $T_{b2}$ followed by a fourth pulse firing for the third duration $Ta_2$.

In some examples, the spacecraft may include, in an on-orbit configuration, a deployed appendage, mechanically coupled with the spacecraft and has a characteristic dynamic response period of oscillation ('T'); and each of $T_{a1}$, $T_{b1}$, $T_{a2}$, and $T_{b2}$ may be selected as a respective particular fraction of the characteristic dynamic response period. In some examples, $T_{a1}$ and $T_{a2}$ may be selected to be within the approximate range of 0.06 T to 0.1 T and $T_{b1}$ and $T_{b2}$ may be selected to be within the approximate range of 0.1 T to 0.3 T. In some examples, $T_{a1}$ and $T_{a2}$ may be selected to be approximately equal to 0.08 T and $T_{b1}$ and $T_{b2}$ are selected to approximately equal 0.21 T. In some examples, $T_{a1}$ and $T_{a2}$ may be selected to be approximately equal to 0.09 T and $T_{b1}$ and $T_{b2}$ may be selected to be approximately equal 0.28 T. In some examples, $T_{a1}$ may equal $T_{a2}$ and $T_{b1}$ may equal $T_{b2}$. In some examples, the appendage may be a solar array or a payload element.

According to some implementations, a spacecraft includes a spacecraft controller and a thruster, the spacecraft controller configured to cause the spacecraft to execute an orbital maneuver by firing a thruster. The spacecraft controller executes a first double pulse, double coast firing (DPDC) sequence with the thruster prior to the orbital maneuver, fires the thruster for a duration of the orbital maneuver, and executes a second DPDC firing sequence with the thruster subsequent to the orbital maneuver.

According to some implementations, a non-transitory computer readable medium has software stored thereon, the software including instructions for causing a controller to: cause a spacecraft, the spacecraft including the controller and a thruster, to execute an orbital maneuver by firing the thruster. Firing the thruster includes executing a first double pulse, double coast firing (DPDC) sequence with the thruster prior to the orbital maneuver, firing the thruster for a duration of the orbital maneuver, and executing a second DPDC firing sequence with the thruster subsequent to the orbital maneuver.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
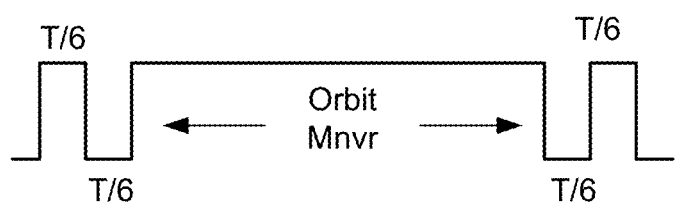
FIG. 1 illustrates pre-maneuver and post-maneuver single pulsed single coast (SPSC) firing sequences.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present disclosure relates to an orbit maneuver strategy including a pre-maneuver and post-maneuver thruster firing sequence configured so as to reduce the dynamic response of a spacecraft appendage. The spacecraft appendage may be for example a deployed solar array, or a payload element. The disclosed techniques include a double pulse, a double coast (DPDC) thruster firing profile where a first DPDC sequence is executed a short time interval immediately before a planned orbit maneuver and a second DPDC sequence is executed immediately after the planned orbit maneuver. The orbit maneuver may constitute firing a thruster for an arbitrary period of time. The period of time may be as small as zero in such case the pre-and post-DPDC firings alone provide sufficient orbital maneuver impulse. In some implementations, the planned orbit maneuver may include an apogee maneuver firing (AMF) for a period of time sufficient to substantially increase orbit perigee altitude. The DPDC firing sequences may be executed such that the durations of each pulse and of each coast period are selected as a particular fraction of a characteristic dynamic response period (period of oscillation, 'T', of the lowest natural frequency, $f_n$) of the system including the deployed appendage and the main body.

Figure 3:
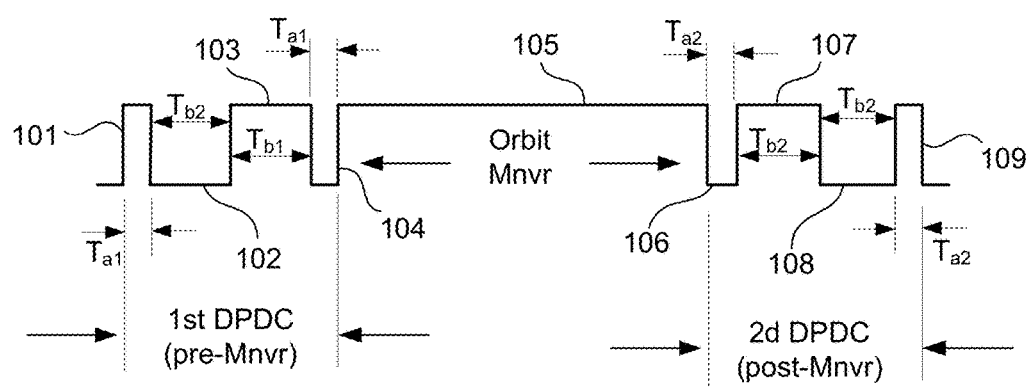
FIG. 3 illustrates an example of a DPDC firing strategy, according to an implementation.

FIG. 3 illustrates an example of a DPDC firing strategy, according to an implementation. It may be observed that, prior to an orbit maneuver 105 a first DPDC firing sequence is executed. The first DPDC sequence prior to orbit maneuver 105 includes a first pulse firing 101 of duration $T_{a1}$, followed by a first coast interval 102 having a duration of $T_{b1}$, followed by a second pulse firing 103 having a duration of $T_{b1}$, followed by a second coast interval 104 having a duration of $T_{a1}$. The second DPDC sequence after orbit maneuver 105 includes a third coast interval 106 having a duration of $T_{a2}$, followed by a third pulse firing 107 having a duration of duration of $T_{b2}$, followed by a fourth coast interval 108 having the duration of $T_{b2}$, followed by a fourth pulse firing 109 having the duration of $T_{a2}$. As explained hereinbelow, the present inventor has found a sheaf of solutions where the duration of each of $T_{a1}$ and $T_{a2}$ is in the approximate range of 0.06 T to 0.1 T and the duration of each of $T_{b1}$ and $T_{a2}$ is in the approximate range of 0.1 T to 0.3 T.

Figure 4:
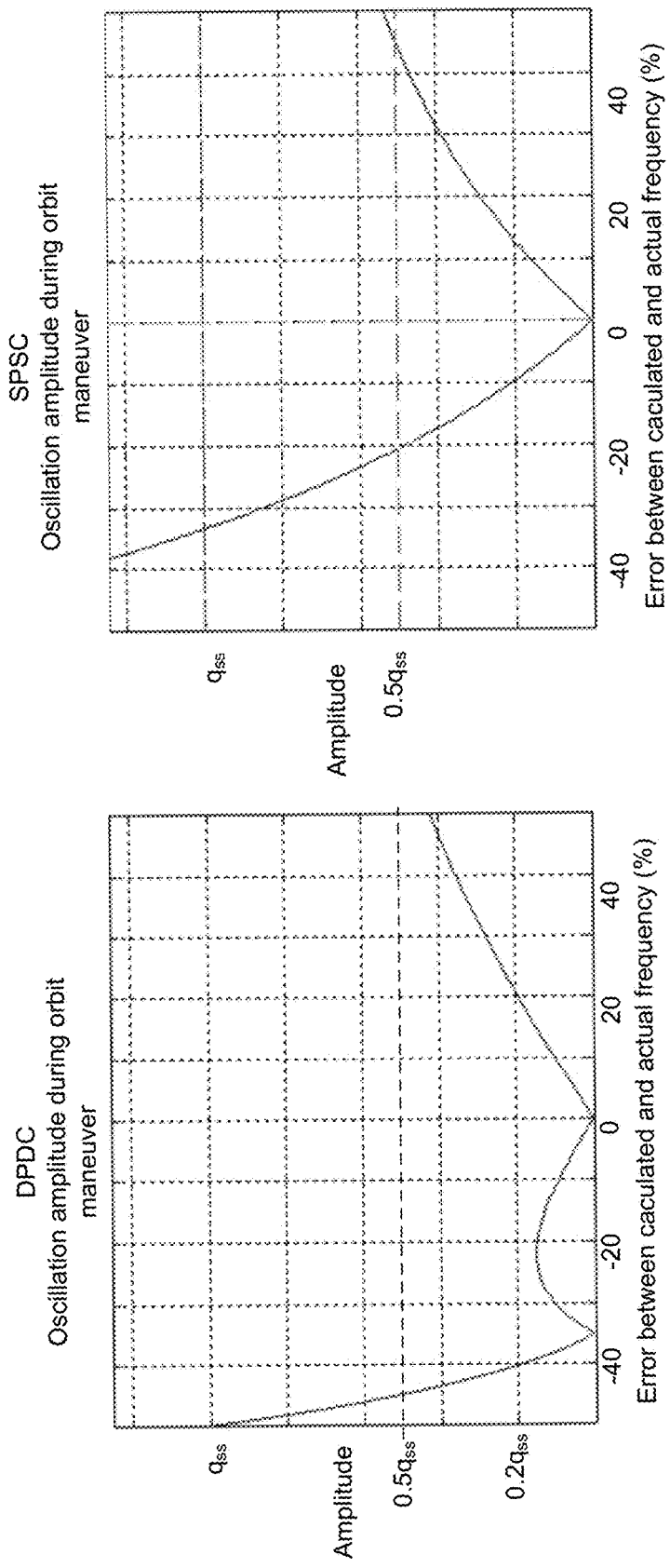
FIG. 4 illustrates performance of the SPSC compared to the DPDC firing strategy.

The presently disclosed DPDC sequence provides a substantial improvement (reduction) in the maximum deflection and amplitude of oscillation of the appendage. The improvement may be better appreciated by comparing FIG. 4, Detail D with FIG. 4, Detail E. It may be observed in Detail D that, for a 20% error between calculated and actual frequency, use of the disclosed DPDC technique limits oscillation amplitude to 0.2 $q_{SS}$. In the absence of the presently disclosed techniques, using a SPSC strategy, for example, the same 20% error can produce amplitude oscillations as high as 0.5 $q_{SS}$.

Figure 5:
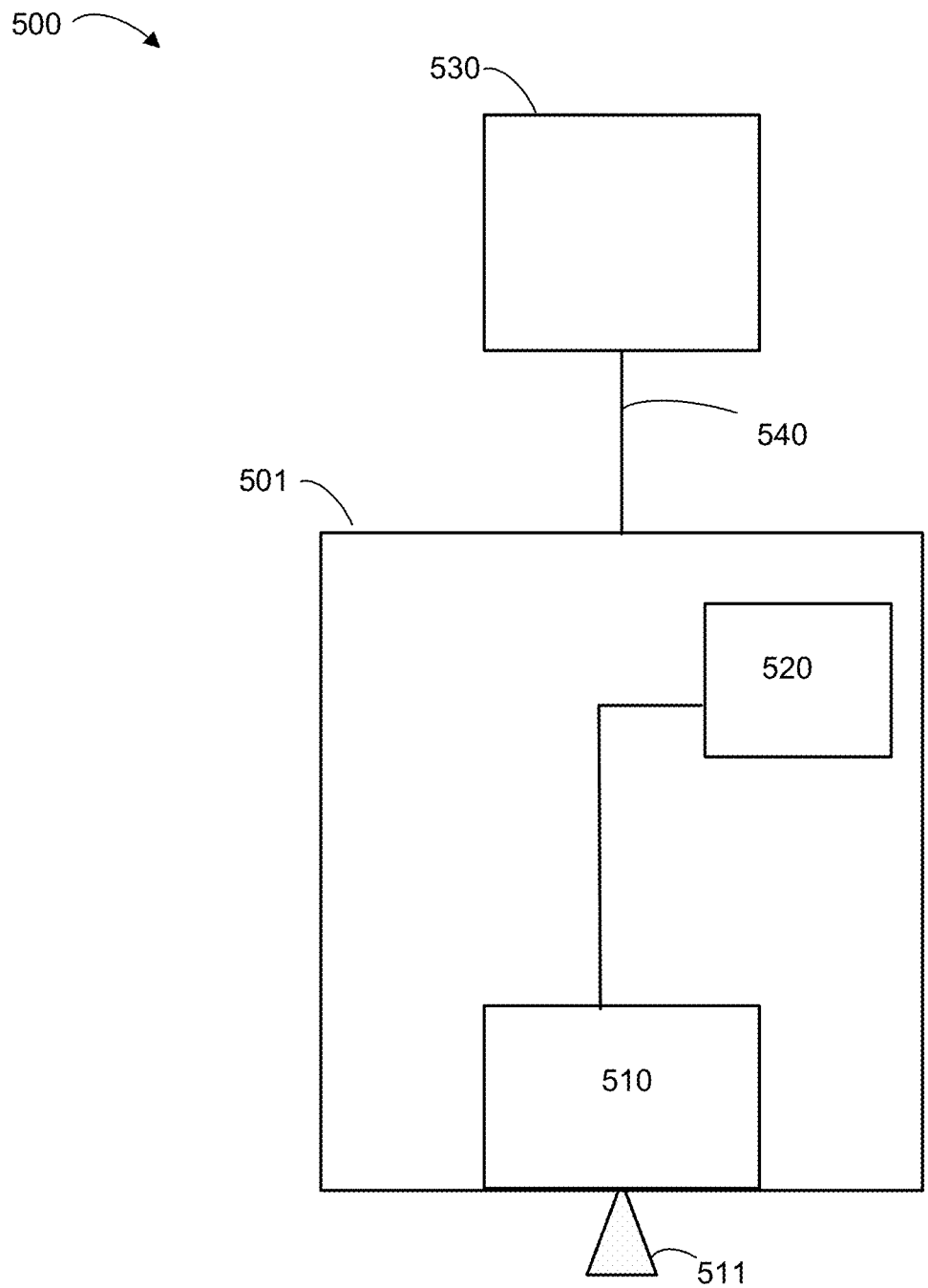
FIG. 5 illustrates a simplified block diagram of an example spacecraft according to an implementation.

Referring now to FIG. 5, a simplified block diagram of an example spacecraft 500 according to an implementation is illustrated. Spacecraft 500 may include a main body 501 and an appendage 530. Disposed on or within the main body 501, the spacecraft 500 may include a propulsion subsystem 510 and spacecraft controller 520. The appendage 530 may include, for example, a solar array or a payload element such as an antenna reflector that is attached with the main body 501 by way of a mechanical coupling 540. In some implementations, the mechanical coupling 540 may include one or more arms, booms or other members and may be configured to reorient the appendage 530 from a launch configuration (not illustrated) to the illustrated on-orbit configuration. The propulsion subsystem 510 may include propulsion equipment, such as tankage and control and service devices (not illustrated) and a thruster 511. Based on the respective primary energy source, the thruster 511 may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. Irrespective of the selected propellant, a negligible amount of thrust results from energy chemically stored in the propellant. Chemical thrusters suitable for spacecraft propulsion systems may deliver relatively high thrust of 10-1000 newtons, for example, substantially irrespective of spacecraft power limitations, but such thrusters are generally incapable of operating at a specific impulse ($I_{sp}$) higher than 500 seconds. Electric thrusters may operate at an $I_{sp}$ of 1000-4000 seconds, but spacecraft power constraints, at least, practically constrain thrust levels to well less than one newton.

The spacecraft may be configured to undergo an orbital maneuver, by firing the thruster 511. The orbital maneuver may be for purposes of raising orbit perigee or apogee, changing an orbit inclination, or for stationkeeping, for example.

Referring still to FIG. 5, spacecraft controller 520 may include or be included in a spacecraft attitude and orbit control subsystem. In the illustrated example, spacecraft controller 520 is communicatively coupled with propulsion subsystem 510 and may be configured to control the operation of propulsion subsystem 510, including thrusters 511.

Figure 6:
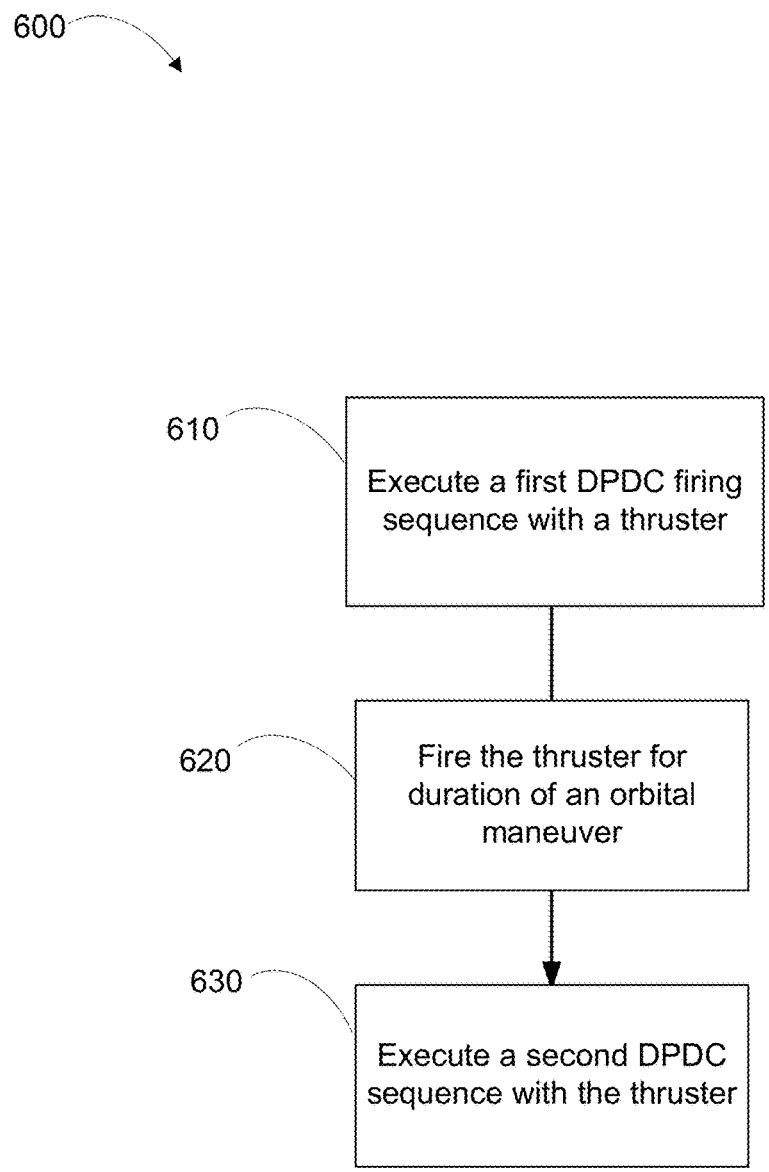
FIG. 6 illustrates a method for performing an orbital maneuver on a spacecraft, according to an implementation.

Referring now to FIG. 6, a method 600 for performing an orbital maneuver on a spacecraft will be described. At block 610, a first DPDC firing sequence may be executed, prior to the orbital maneuver, with a spacecraft thruster. The first DPDC firing sequence may include a first pulse firing having a first duration $T_{a1}$, followed by a first coast interval having a second duration $T_{b1}$, followed by a second pulse firing for the second duration $T_{b1}$, followed by a second coast interval for the first duration $T_{a1}$.

At block 620, the thruster may be fired for the duration of the orbital maneuver.

At block 630, a second DPDC sequence may be executed with the thruster. The second DPDC firing sequence may include a third coast interval for a third duration $T_{a2}$, followed by a third pulse firing for a fourth duration $T_{b2}$, followed by a fourth coast interval for the fourth duration $T_{b2}$ followed by fourth pulse firing for the third duration $T_{a2}$.

In some implementations, $T_{a1}$ and $T_{a2}$ may be substantially identical; similarly, in some implementations $T_{b1}$ and $T_{b2}$ may be substantially identical. In some implementations, however, a selected value of $T_{a2}$ may be different from $T_{a1}$ and a selected value of $T_{b2}$ may be different from $T_{b1}$ so as to account, for example, for variations in period the value of T pre-and post-maneuver that may result from depletion of propellant mass, or other reasons. The following discussion will assume, for simplicity of explanation, that T is constant pre-and post-maneuver, and that $T_a=T_{a1}=T_{a2}$ and $T_b=T_{b1}=T_{b2}$.

As indicated above, the present inventor has appreciated that a DPDC sequence executed prior to and subsequent to an orbital maneuver is advantageously executed where the spacecraft includes, in an on-orbit configuration, a deployed appendage, mechanically coupled with the spacecraft. Where the spacecraft system 500, including spacecraft main body 501 linked to the deployed appendage 530 has a characteristic dynamic response period of oscillation ('T'), each of duration $T_a$ and duration $T_b$ may be a respective selected fraction, preferably less than one, of T. As will be explained below, any one of a sheaf of combinations of fractions $T_a(1)$ and $T_b(1)$, $T_a(2)$ and $T_b(2)$ . . . $T_a(n)$ and $T_b(n)$ may be advantageously selected. Features and benefits of the sheaf of combinations, and how the sheaf of combinations may be determined, will be illustrated with reference to FIGS. 7-14.

Figure 7:
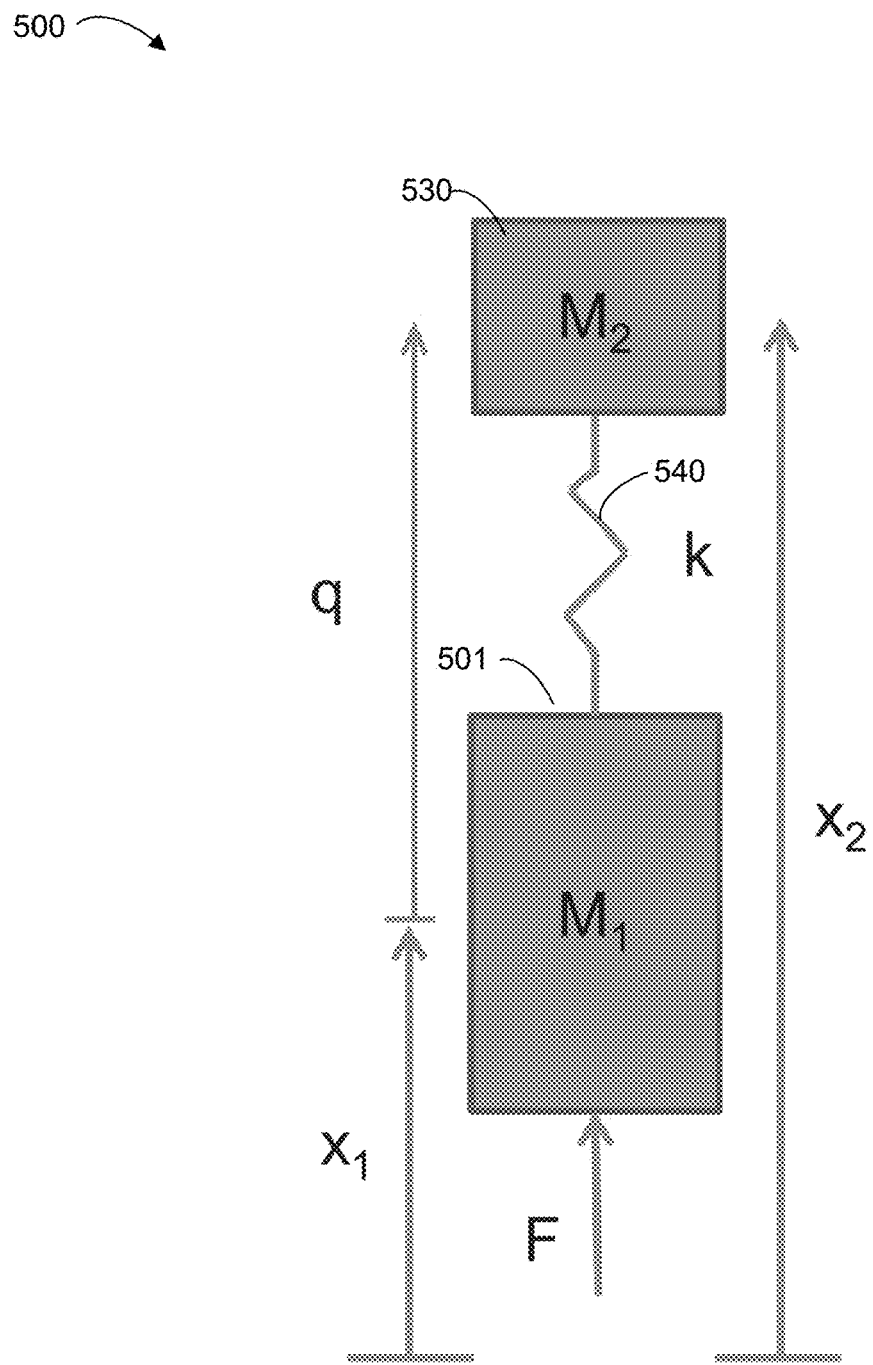
FIG. 7 illustrates a system dynamic model of the spacecraft.

Referring first to FIG. 7, a system dynamic model of the spacecraft 500 is presented, wherein the spacecraft main body 501 is modeled as a rigid mass $M_1$, the appendage 530 is depicted as a rigid mass $M_2$, and the mechanical coupling 540 is depicted as an elastic member having a spring constant 'K'. A relative displacement 'q' between the spacecraft main body 501 and the appendage 530 is defined as the difference, $X_2-X_1$. In reaction to a force, 'F', which may be assumed to be a result of firing a thruster (e.g., thruster 511), the following known equations of motion apply: $M_1\ddot{X}_1=F-k(X_1-X)$; $M_2\ddot{X}_2=-k(X_2-X_1)$. These equations may be transformed to the following expressions:

$$F = M\ddot{X}, \text{ where } M \equiv M_1+M_2 \text{ and } MX \equiv M_1X_1+M_2X_2; \text{ and}$$

$$\ddot{q} + \Omega^2 q = -\frac{F}{M_1},$$

where the "free-free" frequency $\Omega^2$ is defined as $$\frac{k}{\mu}$$

where $$\mu \equiv \frac{M_1 M_2}{M_1 + M_2}.$$

A general solution of the foregoing equations may be found given initial conditions, $q_o$, $\dot{q}_o$:

$$\begin{pmatrix} q(t) - q_{ss} \\ \frac{\dot{q}(t)}{\Omega} \end{pmatrix} = \begin{pmatrix} \cos\Omega t & \sin\Omega t \\ -\sin\Omega t & \cos\Omega t \end{pmatrix} \begin{pmatrix} q_o - q_{ss} \\ \frac{\dot{q}_o}{\Omega} \end{pmatrix}; \text{ where } q_{ss} = \frac{-F}{\Omega^2 M_1}$$

is a steady state equilibrium deflection position corresponding to force 'F'.

Figure 8:
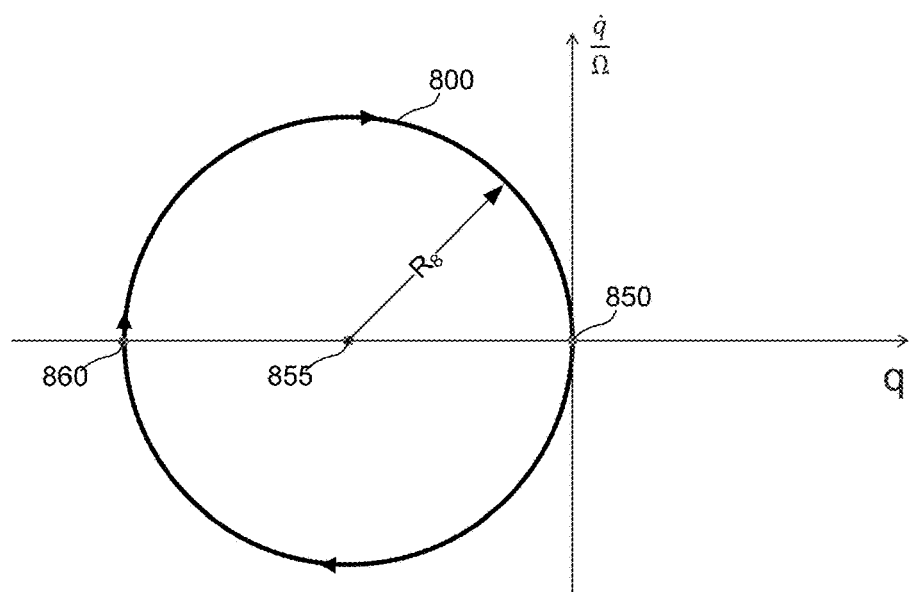
FIG. 8 illustrates solutions to the system dynamic model in the phase-space plane, during a maneuver.

FIG. 8 illustrates solutions to the foregoing matrix equation in the phase-space plane $$\left( q, \frac{\dot{q}}{\Omega} \right),$$

where the solutions correspond to the possible states of the dynamic system modeled in FIG. 7. It will be observed that with the assumed no fire equilibrium point 850 disposed at the origin of the coordinate system, the solutions follow a circle 800 that has a radius, $R_8$ of magnitude $$\frac{F}{\Omega^2 M_1}$$

about the deflected position 855, located at $$\left(\frac{-F}{\Omega^2 M_1}, 0\right)$$

Figure 2:
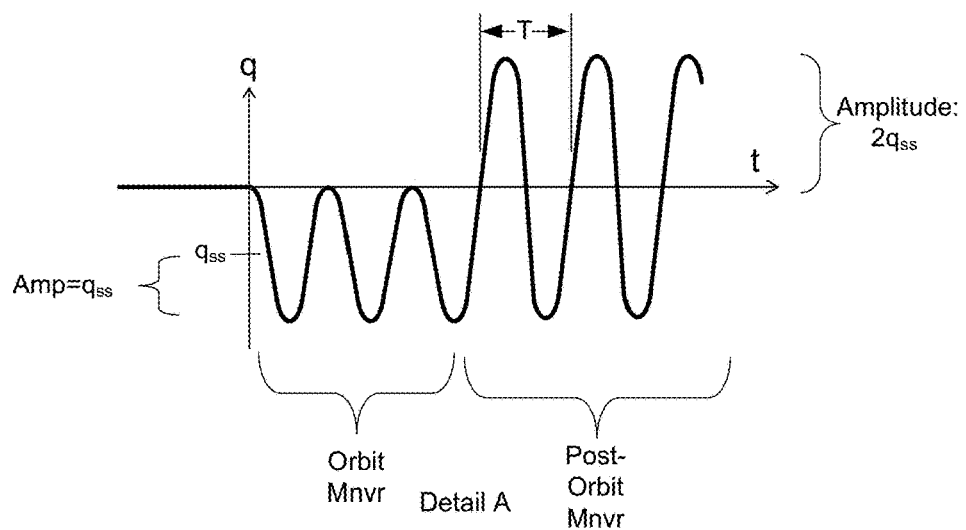
FIG. 2 illustrates simulated results of executing the SPSC firing sequences.
Figure 2:
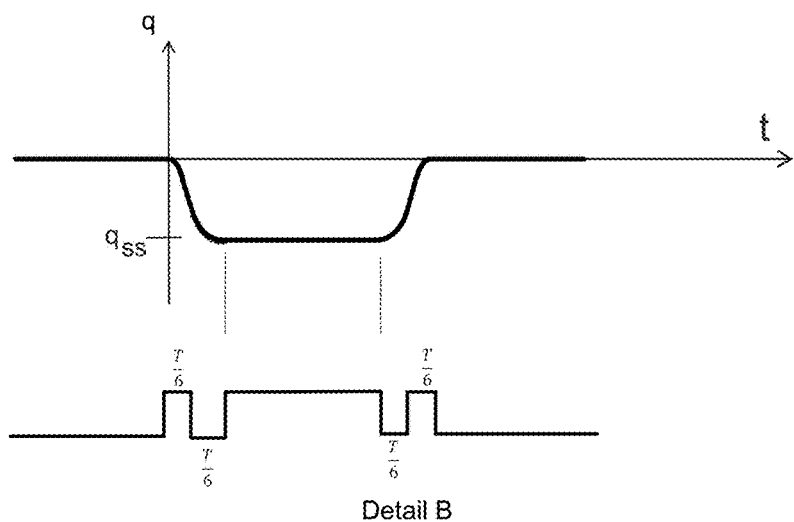
Figure 2:
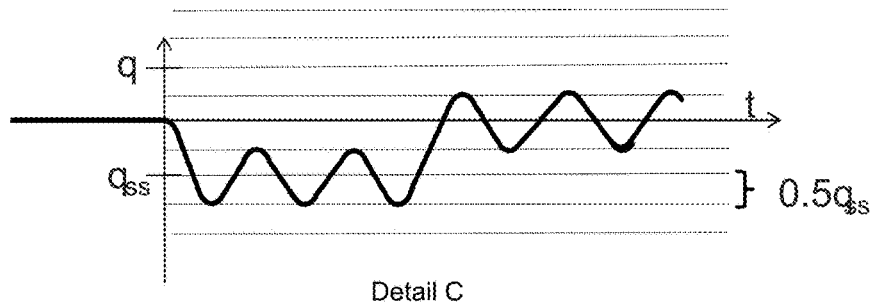

Thus, as may also be observed in FIG. 2, Detail A "Orbit Mnvr" portion, during an orbit maneuver, the dynamic system state will oscillate in a sinusoidal manner such that deflection 'q' varies between respective extremes of 0 (FIG. 8, Position 850) and 2 $q_{SS}$, where $q_{SS}<0$ for $F>0$ (FIG. 8, Position 860).

Figure 9:
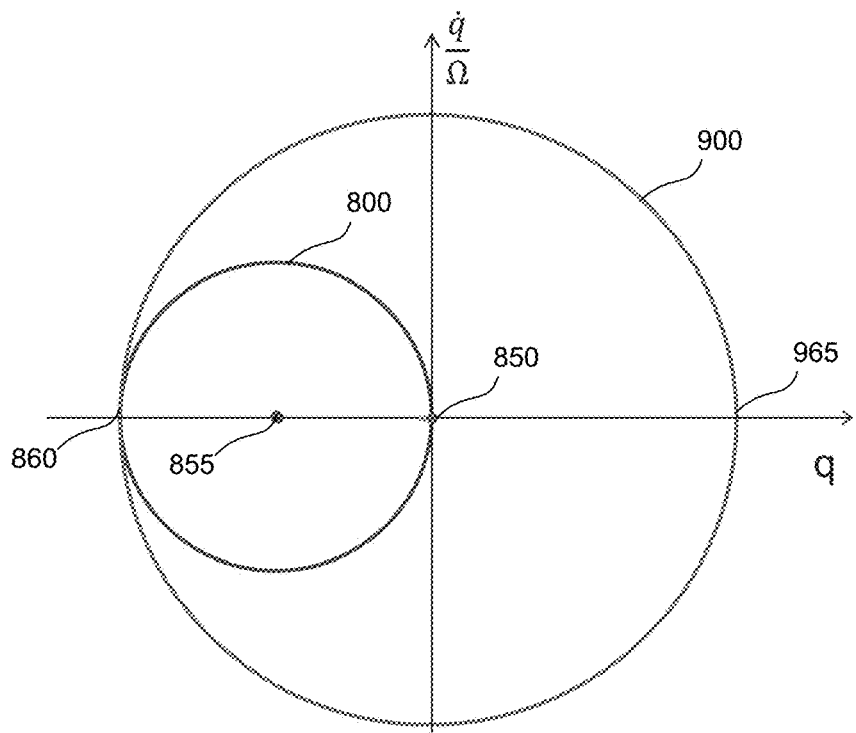
FIG. 9 illustrates solutions to the system dynamic model in the phase-space plane, during and after a maneuver.

Referring now to FIG. 9, it may be observed that in the event an orbit maneuver is terminated at position 860, a new $q_o$ is established having a magnitude of $|2\ q_{SS}|$ and the solutions follow circle 900 about the no fire equilibrium point 850. Consequently, following an orbit maneuver, as may also be observed in FIG. 2, Detail A, "Post-Orbit Mnvr" portion, the dynamic system state will oscillate in a sinusoidal manner such that deflection 'q' varies between respective extremes of $-|2\ q_{SS}|$ (Position 860) and $2\ |q_{SS}|$ (position 965).

Figure 10:
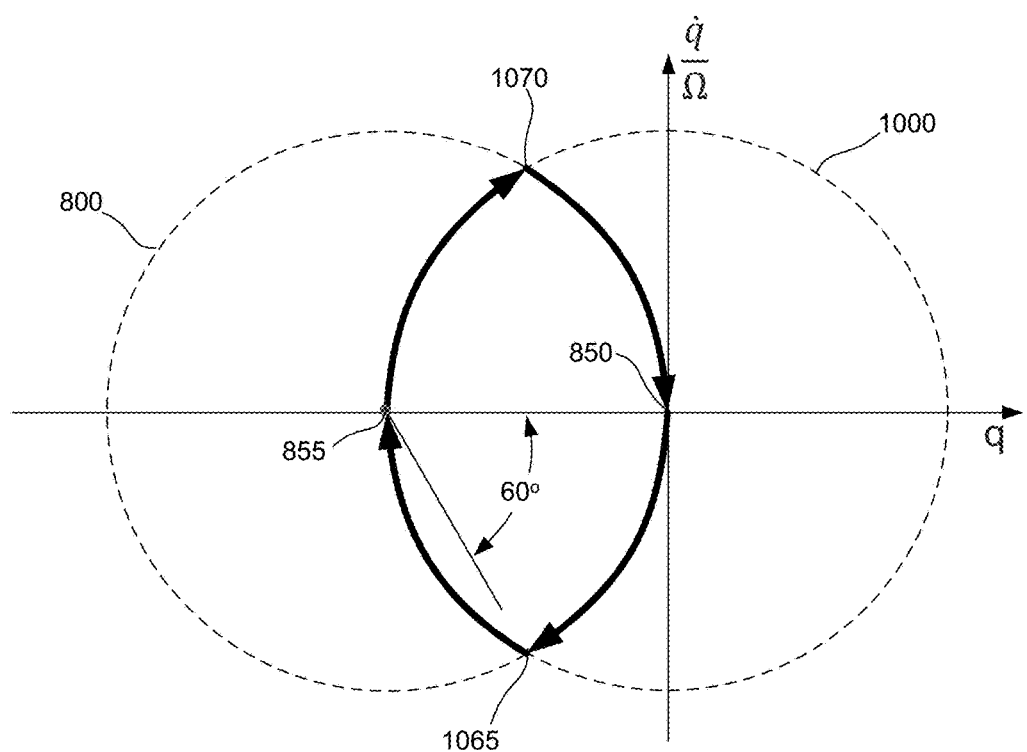
FIG. 10 illustrates solutions to the system dynamic model in the phase-space plane, before, during and after a maneuver using SPSC firing sequences.

Referring next to FIG. 10, the known SPSC sequence is illustrated in a phase-space plane. The technique begins prior to a planned orbit maneuver to be executed with a thruster, by first pulsing the thruster for a period of time equal to T/6 (i.e., for a duration equivalent to 60 degrees of the circumference of circle 800). As a result of such a pulse, the dynamic system state will reach position 1065, at which point the thruster pulse is terminated and the system is allowed to "coast" on circle 1000 for a further interval of time equal T/6. By the end of the coast period, the dynamic system state will reach point 855 which is the steady state equilibrium deflection position corresponding to force 'F'.

According to the SPSC technique, at the moment the dynamic system state reaches point 855, the orbital maneuver should begin. Because the orbit maneuver begins at a system state that is the steady state equilibrium deflection position corresponding to force 'F', firing the thruster to execute the orbital maneuver may be performed without changing the deflection. That is, the nominal state of the system remains at point 855 for the duration of the orbital maneuver. At termination of the orbital maneuver, the system is allowed to coast for a further interval of time equal T/6, at the end of which period of time the dynamic system state will reach position 1070. The SPSC technique then calls for pulsing the thruster for second time for a period of time equal to T/6. At the end of the second firing pulse the system state has reached point 850, which is the no thrust equilibrium point resulting in no oscillation (q=0).

As may be observed in Details B and C of FIG. 2, the SPSC technique may be effective in reducing the maximum deflection and amplitude of oscillation of 'q'. As indicated above, however, effectiveness of the SPSC technique is substantially reduced in circumstances where accurate calculation of the period 'T' is impossible.

Figure 11:
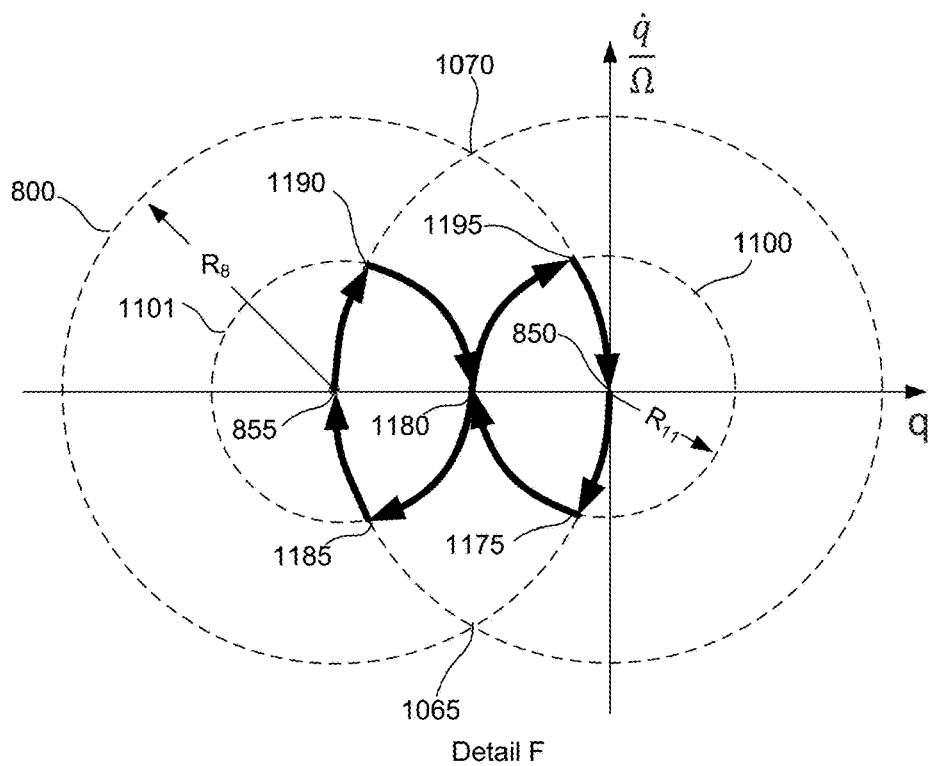
FIG. 11 illustrates solutions to the system dynamic model in the phase-space plane, before, during and after a maneuver using the DPDC firing strategy, according to an implementation
Figure 11:
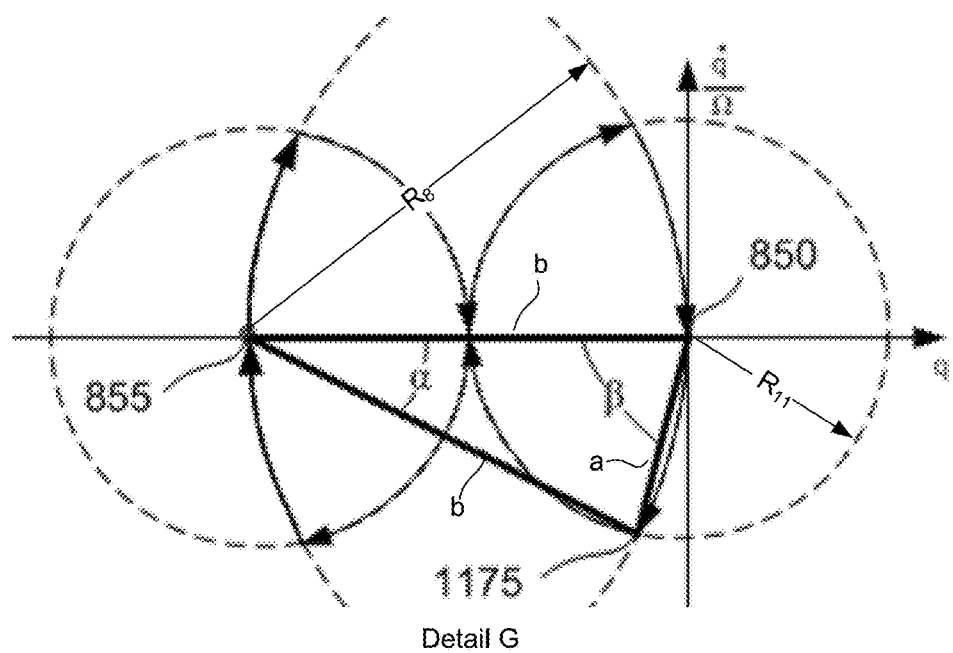

The presently disclosed techniques substantially mitigate this deficiency, as may be better appreciated by referring to FIG. 11, Detail F which illustrates, in the phase-space plane, execution of the DPDC sequence illustrated in FIG. 3. In the illustrated implementation, the DPDC sequence may begin prior to a planned orbit maneuver to be executed with a thruster, by first pulsing the thruster for a period of time $T_a$ sufficient to transition the system from point 850 to point 1175. The point 1175 is located on a circle 1100 centered at the origin of the coordinate system and having a radius $R_{11}=R_8/2$, or $$\frac{F}{2\Omega^2 M_1}.$$

The pulse may then be terminated and the system may be allowed to "coast" on circle 1100 for a further interval of time, $T_b$ sufficient for the system to transition from point 1175 to point 1180, where $$q = -\frac{F}{2\Omega^2 M_1} \text{ and } \frac{\dot{q}}{\Omega} = 0.$$

Then, a second pulse of the thruster may be executed for the same duration, $T_b$. As a result of the second pulse, the system will transition from point 1180 to point 1185. The point 1185 is located on a circle 1101 having a center at point 855 and having a radius identical to $R_{11}$. The second pulse may then be terminated and the system may be allowed to "coast" for a further interval of time, $T_a$ sufficient for the system to transition from point 1185 to point 855.

Having reached point 855, the orbit maneuver may be initiated. Because the orbit maneuver begins at a system state that is the steady state equilibrium deflection position corresponding to force 'F', firing the thruster to execute the orbital maneuver may be performed without changing the deflection. That is, just as in the SPSC technique, the nominal state of the system remains at point 855 for the duration of the orbital maneuver.

According to the presently disclosed DPDC techniques, at termination of the orbital maneuver the system may be allowed to coast for an interval of time, $T_a$ sufficient for the system to transition from point 855 to point 1190. Then a thruster pulse may be executed having a duration of $T_b$ that will transition the system from point 1190 to point 1180. Then the system may be allowed to coast for an interval of time, $T_b$, sufficient for the system to transition from point 1180 to point 1195, following which a final thruster pulse of duration of $T_a$ may be executed. At the end of this thruster pulse, the system state has reached point 850, which is the no thrust equilibrium point.

Like the SPSC technique, the disclosed DPDC technique, provides (1) that the orbit maneuver is executed when the system is in a nominal state represented by point 855, the steady state equilibrium deflection position corresponding to force 'F'; and (2) that, following an orbit maneuver, the system state has reached point 850, which is the no thrust equilibrium point. However, the present inventor has appreciated that the DPDC technique is decidedly more robust to uncertainties in the system natural frequency and period. For example, referring again to FIG. 4, and comparing Detail D with Detail E, for a 20% error between calculated and actual frequency, use of the disclosed DPDC technique, with appropriately selected values of $T_a$ and $T_b$ limits oscillation amplitude to $0.2|q_{SS}|$, whereas, as noted above, assuming the same 20% error, the SPSC can produce amplitude oscillations as high as $0.5|q_{SS}|$.

As indicated above, the present inventor has found a sheaf of solutions where the duration of $T_a$ is in the approximate range of 0.06 T to 0.09 T and the duration of $T_b$ is in the approximate range of 0.2 T to 0.3 T. Derivations of this sheaf of solutions will now be explained. Referring now to detail G of FIG. 11, an expanded and annotated portion of Detail F is illustrated. It will be observed that the points 850, 855 and 1175 form an isosceles triangle, in which angle α is disposed between two sides of equal length 'b' equal to $R_8$, and opposite to a side of length 'a' equal to $R_{11}=R_8/2$. According to the law of cosines, $(R_8/2)^2=R_8^2+R_8^2+2R_8^2 \cos(\alpha)$. Thus, it will be appreciated that $\alpha = a\cos(7/8)$ or about 28.955° and that $T_a$ is approximately equal to $(28.955/360) \times T$, or about 0.08044 T. Similarly, it can be shown that angle $\beta = a\cos(1/4)$, or about 75.522° and that $T_b$ is approximately equal to $(75.522/360) \times T$, or about 0.20978 T.

Figure 12:
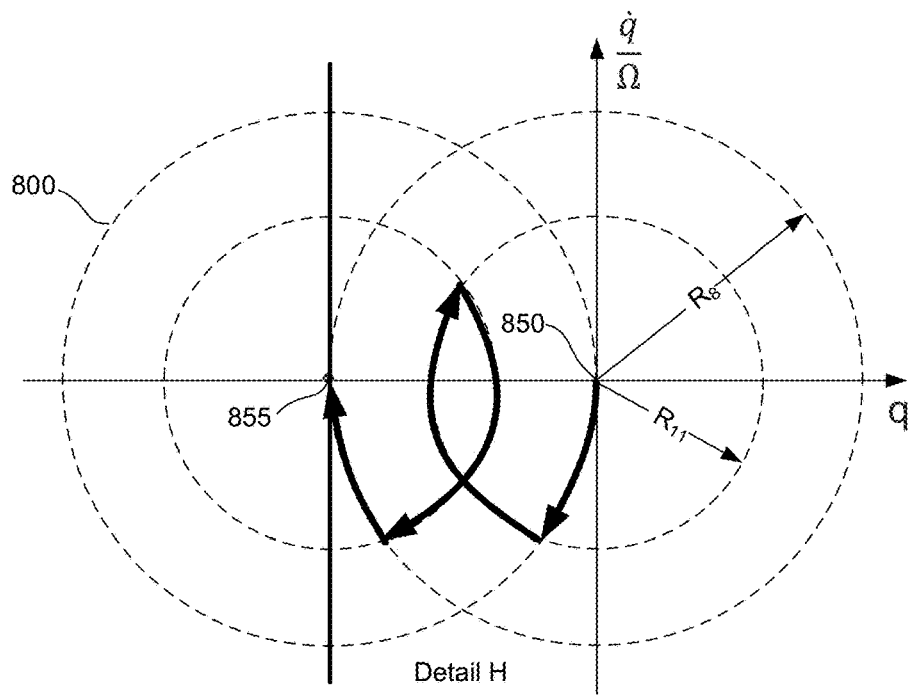
FIG. 12 illustrates solutions to the system dynamic model in the phase-space plane, before and during a maneuver using the DPDC firing strategy, according to a further implementation
Figure 12:
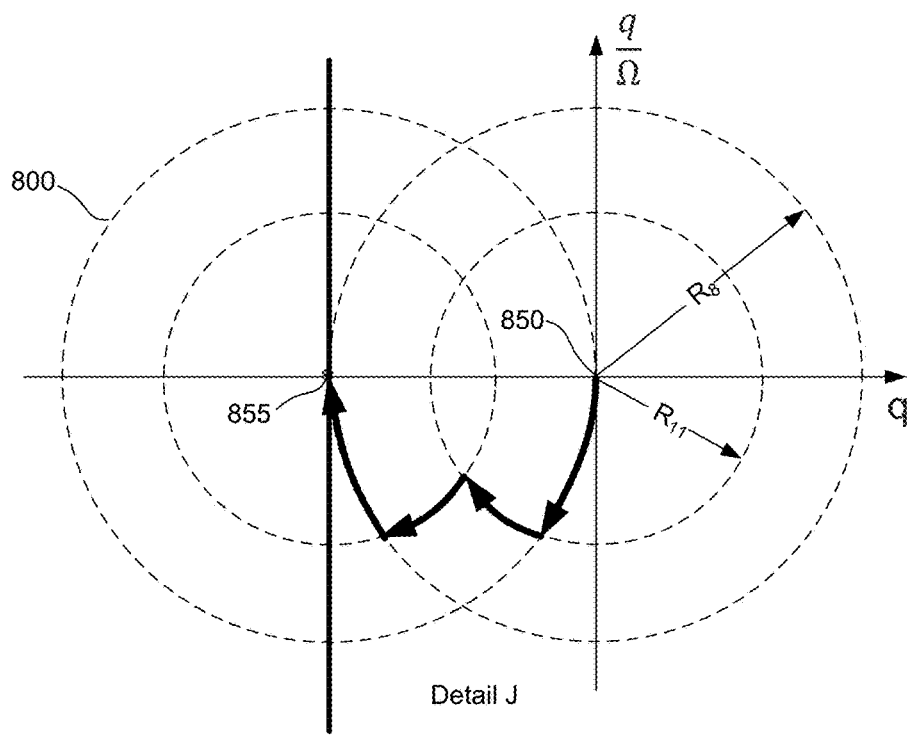

The above calculated values of $T_a$ and $T_b$ apply in the specific case where $R_{11}=R_8/2$, but the presently contemplated DPDC techniques do not require that relationship. Referring now to FIG. 12, it is illustrated that, where $R_{11}$ has a magnitude greater than $R_8/2$ and less than $R_8$, a pair of values of $T_a$ and $T_b$ may be selected from either Detail H or Detail I while still achieving an objective of starting the orbit maneuver upon reaching the state represented by point 855. Although omitted from the illustrations for clarity, it will be appreciated that a DPDC sequence may be executed upon termination of the orbit maneuver so as to return the system to the state represented by point 850.

Figure 13:
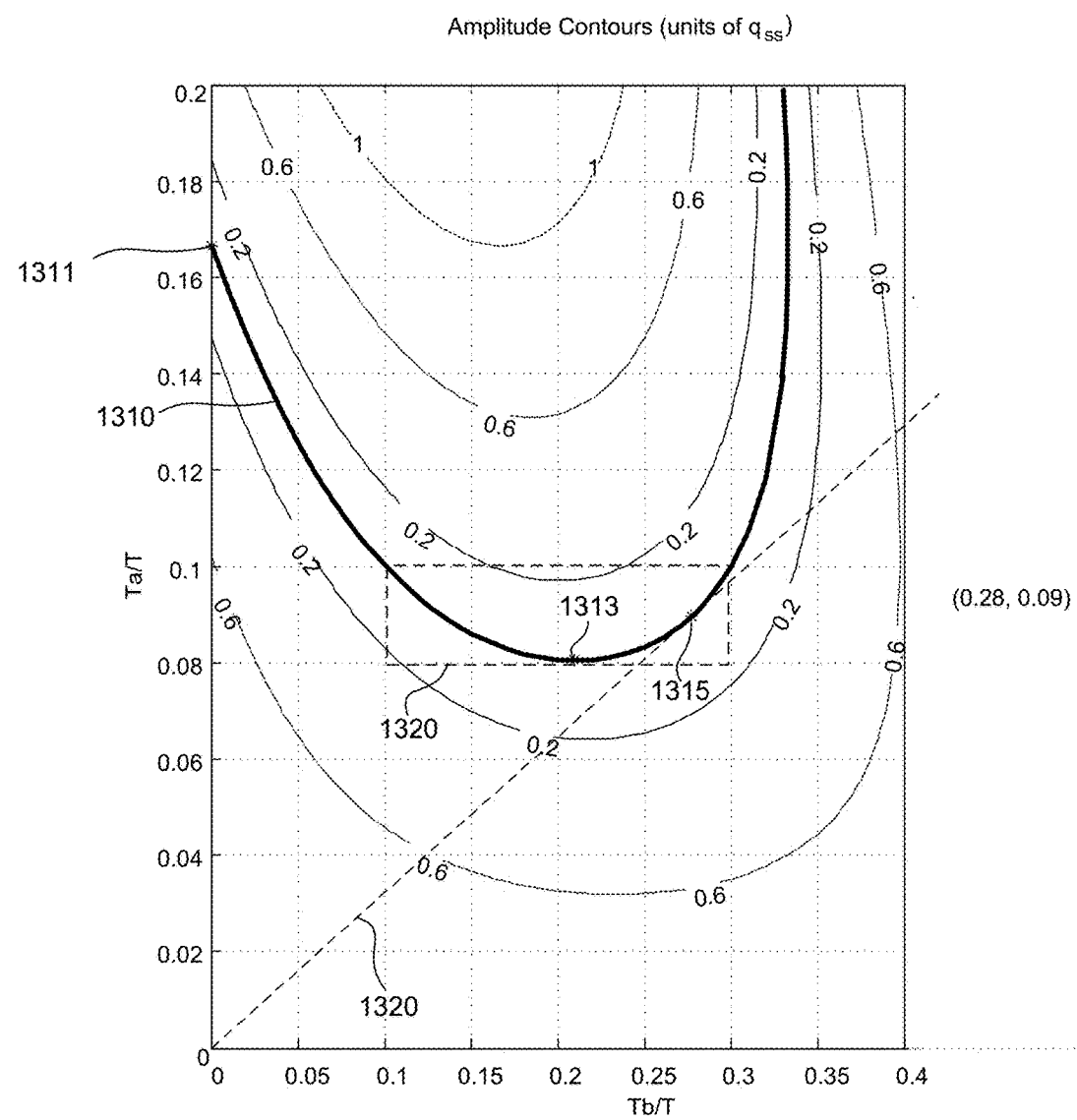
FIG. 13, illustrates contour plots of oscillation about a steady state displacement as a function of $T_a/T$ and $T_b/T$.

Referring now to FIG. 13, contour plots of oscillation about $q_{SS}$ are presented as a function of $T_a/T$ and $T_b/T$. In particular, plot 1310 represents the sheaf of solutions for $T_a$ and $T_b$ that results in a nominal amplitude of oscillation about $q_{SS}$ equal to zero. At a first point 1311, the SPSC technique is represented, wherein $T_b=0$ and $T_a=T/6$. At a second point 1313, the DPDC solution illustrated in FIG. 11 is represented, wherein $T_a=0.08044$ T and $T_b=0.20978$ T. Although a wide range of DPDC solutions have been found to be beneficially less sensitive to uncertainty in the system natural frequency and period than the SPSC technique, the portion of plot 310 enclosed by dashed box 1320 is generally the most advantageous. In a particularly advantageous implementation, a point 1315, being tangent to a line 1320 drawn through the coordinate system origin represents a value $T_a$ of approximately 0.09 T and a value of $T_b$ of approximately 0.28 T.

Implementations of the subject matter described in this specification may be implemented as one or more computer programs, i.e., one or more modules of computer program instructions, encoded on non-transitory computer readable medium for execution by, or to control the operation of, a data processing apparatus, such as, for example, spacecraft controller 520.

Thus, techniques for performing an orbital maneuver on a spacecraft have been disclosed. The foregoing merely illustrates principles of the invention. For example, although a "double" pulse, "double" coast techniques has been described in detail, the presently disclosure contemplates "triple" pulse, "triple" coast or "quadruple" pulse and "quadruple" coast intervals, etc., according to the disclosed principles. Moreover, $T_a$ and $T_b$ may be selected so as to simultaneously reduce oscillations of two modes (resulting from two separate appendages, or a single appendage with multiple modes, for example, a torsional mode and an out of plane mode). It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for performing an orbital maneuver on a spacecraft by firing a thruster, the method comprising:
   executing a first double pulse, double coast firing (DPDC) sequence with the thruster prior to the orbital maneuver;
   firing the thruster for a duration of the orbital maneuver; and
   executing a second DPDC firing sequence with the thruster subsequent to the orbital maneuver.

2. The method of claim 1, wherein:
   the first DPDC firing sequence includes a first pulse firing having a first duration $T_{a1}$, followed by a first coast interval having a second duration $T_{b1}$, followed by a second pulse firing for the second duration $T_{b1}$, followed by a second coast interval for the first duration $T_{a1}$; and
   the second DPDC firing sequence includes a third coast interval for a third duration $T_{a2}$, followed by a third pulse firing for a fourth duration $T_{b2}$, followed by a fourth coast interval for the fourth duration $T_{b2}$ followed by a fourth pulse firing for the third duration $Ta_2$.

3. The method of claim 1, wherein:
   the spacecraft includes, in an on-orbit configuration, a deployed appendage, mechanically coupled with the spacecraft and has a characteristic dynamic response period of oscillation ('T'); and
   each of $T_{a1}$, $T_{b1}$, $T_{a2}$, and $T_{b2}$ is selected as a respective particular fraction of the characteristic dynamic response period.

4. The method of claim 3, wherein $T_{a1}$ and $T_{a2}$ are selected to be within the approximate range of 0.06 T to 0.1 T and $T_{b1}$ and $T_{b2}$ are selected to be within the approximate range of 0.1 T to 0.3 T.

5. The method of claim 3, wherein $T_{a1}$ and $T_{a2}$ are selected to be approximately equal to 0.08 T and $T_{b1}$ and $T_{b2}$ are selected to approximately equal 0.21 T.

6. The method of claim 3, wherein $T_{a1}$ and $T_{a2}$ are selected to be approximately equal to 0.09 T and $T_{b1}$ and $T_{b2}$ are selected to be approximately equal 0.28 T.

7. The method of claim 3, wherein $T_{a1}=T_{a2}$ and $T_{b1}=T_{b2}$.

8. The method of claim 3, wherein the appendage is a solar array or a payload element.

9. A spacecraft comprising a spacecraft controller and a thruster, the spacecraft controller configured to cause the spacecraft to execute an orbital maneuver by firing a thruster, wherein the spacecraft controller:
   executes a first double pulse, double coast firing (DPDC) sequence with the thruster prior to the orbital maneuver;
   fires the thruster for a duration of the orbital maneuver; and
   executes a second DPDC firing sequence with the thruster subsequent to the orbital maneuver.

10. The spacecraft of claim 9, wherein:
   the first DPDC firing sequence includes a first pulse firing having a first duration $T_{a1}$, followed by a first coast interval having a second duration $T_{b1}$, followed by a second pulse firing for the second duration $T_{b1}$, followed by a second coast interval for the first duration $T_{a1}$; and
   the second DPDC firing sequence includes a third coast interval for a third duration $T_{a2}$, followed by a third pulse firing for a fourth duration $T_{b2}$, followed by a fourth coast interval for the fourth duration $T_{b2}$ followed by a fourth pulse firing for the third duration $Ta_2$.

11. The spacecraft of claim 9, wherein:
the spacecraft includes, in an on-orbit configuration, a deployed appendage, mechanically coupled with the spacecraft and has a characteristic dynamic response period of oscillation ('T'); and
each of $T_{a1}$, $T_{b1}$, $T_{a2}$, and $T_{b2}$ is selected as a respective particular fraction of the characteristic dynamic response period.

12. The spacecraft of claim 11, wherein $T_{a1}$ and $T_{a2}$ are selected to be within the approximate range of 0.06 T to 0.1 T and $T_{b1}$ and $T_{b2}$ are selected to be within the approximate range of 0.1 T to 0.3 T.

13. The spacecraft of claim 11, wherein $T_{a1}$ and $T_{a2}$ are selected to be approximately equal to 0.08 T and $T_{b1}$ and $T_{b2}$ are selected to approximately equal 0.21 T.

14. The spacecraft of claim 11, wherein $T_{a1}$ and $T_{a2}$ are selected to be approximately equal 0.09 T and $T_{b1}$ and $T_{b2}$ are selected to approximately equal 0.28 T.

15. The spacecraft of claim 11, wherein $T_{a1}=T_{a2}$ and $T_{b1}=T_{b2}$.

16. The spacecraft of claim 11, wherein the appendage is a solar array or a payload element.

17. A non-transitory computer readable medium having software stored thereon, the software including instructions for causing a controller to:
cause a spacecraft, the spacecraft including the controller and a thruster, to execute an orbital maneuver by firing the thruster, wherein the firing the thruster includes:
executing a first double pulse, double coast firing (DPDC) sequence with the thruster prior to the orbital maneuver;
firing the thruster for a duration of the orbital maneuver; and
executing a second DPDC firing sequence with the thruster subsequent to the orbital maneuver.

18. The computer readable medium of claim 17, wherein:
the first DPDC firing sequence includes a first pulse firing having a first duration $T_{a1}$, followed by a first coast interval having a second duration $T_{b1}$, followed by a second pulse firing for the second duration $T_{b1}$, followed by a second coast interval for the first duration $T_{a1}$; and
the second DPDC firing sequence includes a third coast interval for a third duration $T_{a2}$, followed by a third pulse firing for a fourth duration $T_{b2}$, followed by a fourth coast interval for the fourth duration $T_{b2}$ followed by a fourth pulse firing for the third duration $T_{a2}$.

19. The computer readable medium of claim 17, wherein:
the spacecraft includes, in an on-orbit configuration, a deployed appendage, mechanically coupled with the spacecraft and has a characteristic dynamic response period of oscillation ('T'); and
each of $T_{a1}$, $T_{b1}$, $T_{a2}$, and $T_{b2}$ is selected as a respective particular fraction of the characteristic dynamic response period.

20. The computer readable medium of claim 19, wherein $T_{a1}=T_{a2}$ and $T_{b1}=T_{b2}$.

* * * * *